F. G. THIESFELD.
STREET SWEEPER.
APPLICATION FILED JAN. 18, 1916.
1,215,078.
Patented Feb. 6, 1917.
2 SHEETS—SHEET 1.
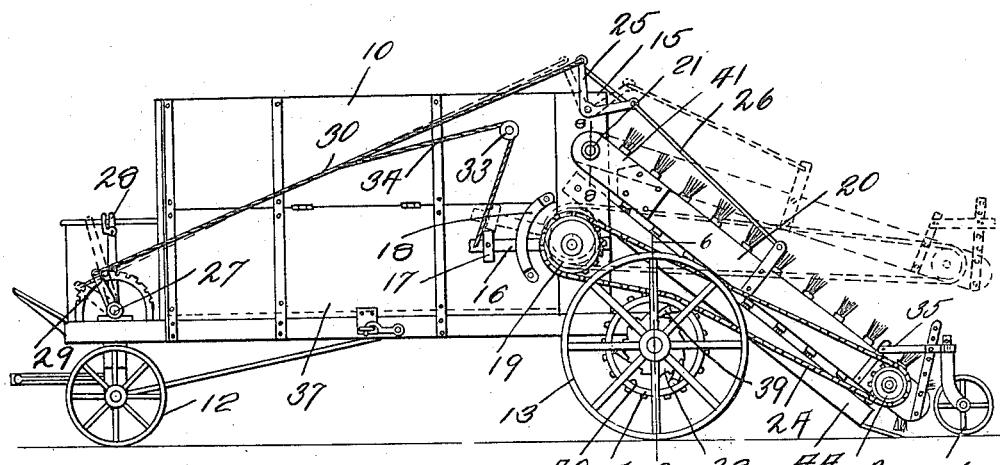
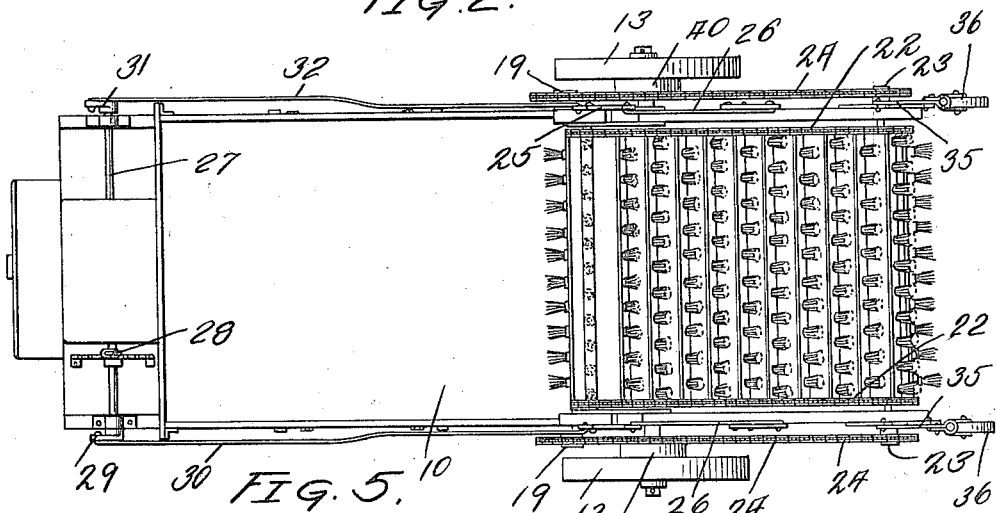
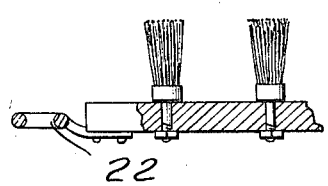
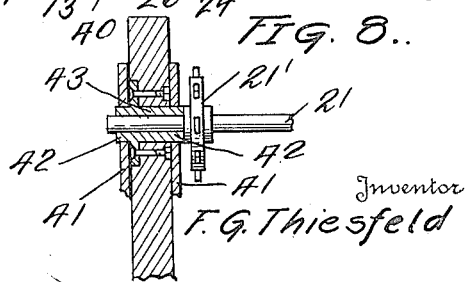
Witnesses
Inventor
F. G. Thiesfeld
By
Attorneys F. G. THIESFELD.
STREET SWEEPER.
APPLICATION FILED JAN. 18, 1916.
1,215,078.
Patented Feb. 6, 1917.
2 SHEETS—SHEET 2.
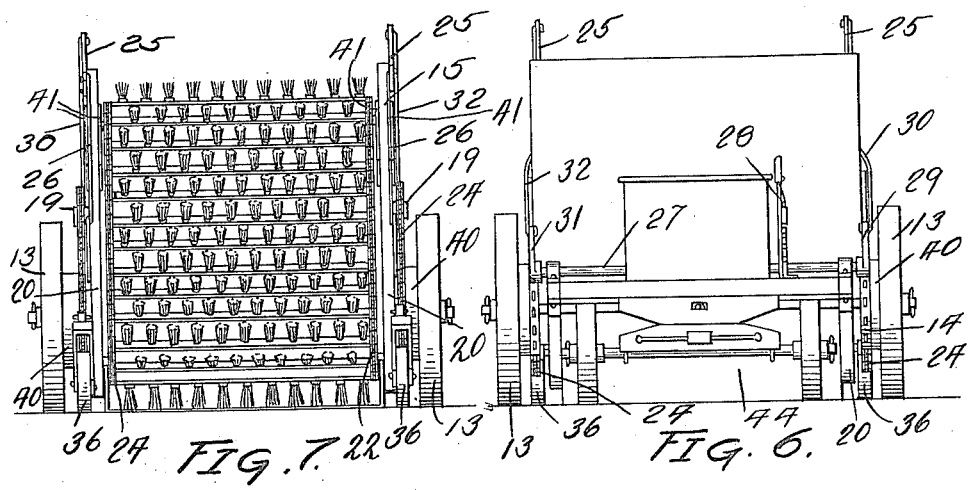
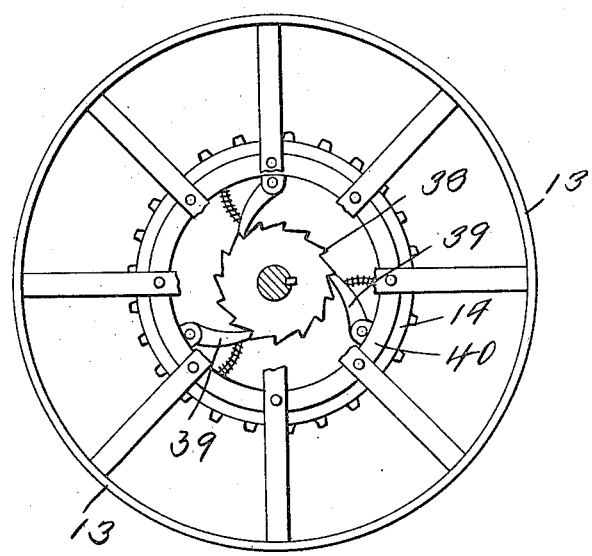
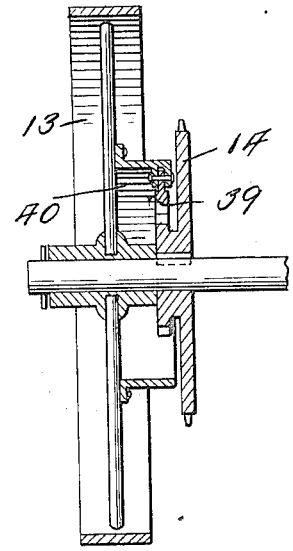
Witnesses
Inventor
F. G. Thiesfeld
By Attorneys

UNITED STATES PATENT OFFICE.

FRED G. THIESFELD, OF LORTON, NEBRASKA.

STREET-SWEEPER.

1,215,078.

Specification of Letters Patent. Patented Feb. 6, 1917.

Application filed January 18, 1916. Serial No. 72,779.

*To all whom it may concern:*

Be it known that I, FRED G. THIESFELD, a citizen of the United States, residing at Lorton, in the county of Otoe, State of Nebraska, have invented certain new and useful Improvements in Street-Sweepers; and I do hereby declare the following to be a full, clear, and exact description of the invention, such as will enable others skilled in the art to which it appertains to make and use the same.

This invention relates to improvements in street sweepers.

One object of the invention is to provide a street sweeper which includes novel means for driving the sweeping element, and novel means for simultaneously raising and lowering the sweeping element and disengaging and engaging the driving means.

Other objects and advantages will be apparent from the following description when taken in connection with the accompanying drawing.

In the drawing:

Figure 1 is a side elevation of a street sweeping machine made in accordance with my invention;

Fig. 2 is a top plan view;

Fig. 3 is a rear elevation;

Fig. 4 is a side elevation showing the sweeping element in raised position;

Fig. 5 is an enlarged detail sectional view of a portion of the brush belt;

Fig. 6 is an enlarged vertical sectional view on the line 6—6 of Fig. 1;

Fig. 7 is an enlarged sectional detail view on the line 7—7 of Fig. 2; and

Fig. 8 is an enlarged vertical sectional view on the line 8—8 of Fig. 1.

Referring particularly to the accompanying drawing, 10 represents the body of the street sweeper which is preferably in the form of a closed receptacle, and is supported by the front and rear wheels 12 and 13 respectively. Secured on the inner side of each of the rear wheels is a sprocket wheel 14, and of the same size. On the rear of the body of the vehicle and on each side is a vertical standard 15. To each of these standards is pivotally connected a forwardly extending arm 16 carrying on its front end an adjustable weight 17, and being guided by an arcuate member 18 secured to the side of the vehicle. Mounted on the arm, at a suitable distance forwardly of the pivot thereof is a sprocket wheel 19. Pivotally mounted on the upper portions of the standards 15 is a downwardly and rearwardly extending frame 20 having shafts 21 in the upper and lower ends thereof provided with sprockets 21′, and around which the chains 22′ of the brush belt or apron 22 travel. The lower roller has on its ends the sprocket wheels 23, and engaged around these sprocket wheels and around the sprocket wheels 19 are the chains 24, the lower lap of each of which is adapted to engage with one of the sprocket wheels 14 carried by a wheel 13. At the upper end of the standard 15 is mounted an angle lever 25, one arm of which is connected to the frame 20 by a link 26. It will of course be understood that there are two of these levers, one on each of the standards, and each connected to the frame 20. On the front of the vehicle is mounted a transverse shaft 27 on one end of which is secured an operating lever 28, and extending at an angle from the shaft, and at an acute angle with respect to the lever 28 is an arm 29. Extending between this arm 29 and the other arm of the angle lever 25 is a connecting rod or link 30. On the other end of the shaft 27 is a similar arm 31, which is connected to the other angle lever by means of the link or connecting rod 32. Mounted on the upper end of each of the standards, in rear of the angle lever 25 is a pulley 33. Extending around this pulley, and connected at one end to the free end of the arm 16, and at its other end to the rod or link 30, at a point intermediate the length thereof is a cord 34. A similar cord 35 is connected to the rod or link 32 and the other arm 16.

When the operating lever 28 is swung forwardly, the shaft will be rocked so as to rock the angle levers 25 by means of the links 30 and 31 and thus raise the sweeper frame 20. The upward movement of the frame carries with it the chains 24 so that they become disengaged from the sprocket wheels 14 and the movement of the brush belt stopped. By means of the cords 34 the arms 16 raise the sprocket wheels 19 so as to prevent the chains 24 being stretched by reason of the different positions of the center of the swing of the frame 20 and of the chains 24.

The lower end of the sweeper frame 20 has mounted thereon a pivotally adjustable pair of arms 35 which support the caster wheels 36, said caster wheels holding the lower end of the frame against dragging on the ground.

In one side of the body of the vehicle is a door 37 which permits of quick and easy removal of dirt within the box.

Mounted on the rear axle, and inwardly of each of the sprocket wheels is a ratchet wheel 38, the teeth of which are adapted to be engaged by pivoted pawls 39 carried by a ring 40 secured to the rear wheel concentric to said sprocket and ratchet wheel. These pawls and the teeth of the ratchet wheel are so arranged that they only operate when the vehicle is moving in a forward direction, sliding idly over the ratchet wheel when the vehicle is backed.

The upper end of each of the sides of the frame 20 has secured thereto two plates 41 which straddle an upright 15. These plates have openings 42 receiving the ends of a sleeve 43 disposed through the upright, and on which the said plates have pivotal movement. Below the sweeper frame, and pivotally supported at one end by the said frame, and at the other by the uprights, is a pan 44 into which the brush belt sweeps the dirt and carries the same into the wagon-box.

What is claimed is:

1. The street sweeping machine comprising in combination with a receptacle, and a running gear therefor, a sweeping frame pivoted upon said receptacle, and extending rearwardly therefrom, an endless sweeping element mounted in said frame, and endless driving connection having one bearing upon said frame, and operative with said sweeping element, a second bearing for said endless connection on the receptacle, a movable mounting for said bearing, and a driving element operative by said running gear adapted to engage a run of said endless driving connection when said frame is lowered, and means for raising and lowering said frame, said movable bearing for the endless driving connection adapted to be moved simultaneously with a movement of said frame in order to compensate for the tautening and slackening of the runs of the endless driving connection, when the frame is swung.

2. A street sweeping machine, comprising in combination with a wheeled receptacle, a swinging frame pivoted upon the receptacle and extending rearwardly therefrom, sweeping mechanism carried by said frame, an endless driving connection having one bearing upon the frame, and another upon the receptacle, a movable mounting for the bearing for the connection upon the receptacle, a driving element carried upon the running gear of the receptacle adapted to engage the intermediate portion of said endless driving connection when said frame is lowered, said connection swinging away from said element when the frame is elevated.

In testimony whereof, I affix my signature, in the presence of two witnesses.

FRED G. THIESFELD.

Witnesses:
H. C. H. DAMME,
H. W. FRERICHS.